(12) United States Patent
Kobayashi et al.

(10) Patent No.: US 7,520,690 B2
(45) Date of Patent: Apr. 21, 2009

(54) PART POSITIONER AND PART PRESSING MEMBER

(75) Inventors: Fujio Kobayashi, Hachiohji (JP); Hiroyuki Miyaki, Fussa (JP); Kenji Nakano, Hamura (JP)

(73) Assignee: Kioritz Corporation, Tokyo (JP)

( * ) Notice: Subject to any disclaimer, the term of this patent is extended or adjusted under 35 U.S.C. 154(b) by 138 days.

(21) Appl. No.: 11/267,157

(22) Filed: Nov. 7, 2005

(65) Prior Publication Data

US 2006/0120796 A1 Jun. 8, 2006

(30) Foreign Application Priority Data

Dec. 3, 2004 (JP) ............... 2004-350948

(51) Int. Cl.
*F16B 2/18* (2006.01)

(52) U.S. Cl. ............ 403/110; 403/374.3; 403/409.1; 30/386

(58) Field of Classification Search ........... 403/110, 403/374.3, 116, 374.4, 374.5, 408.1, 409.1; 30/385, 386, 387

See application file for complete search history.

(56) References Cited

U.S. PATENT DOCUMENTS

| 4,486,953 | A | * | 12/1984 | Halverson | 30/385 |
| 4,620,814 | A | * | 11/1986 | May | 403/374.4 |
| 5,263,351 | A | * | 11/1993 | Berg, III | 403/374.3 |
| 5,353,506 | A | * | 10/1994 | Muller et al. | 30/386 |
| 5,452,529 | A | * | 9/1995 | Neuenfeldt et al. | 403/374.3 |
| 5,491,899 | A | * | 2/1996 | Schliemann et al. | 30/386 |
| 6,061,915 | A | * | 5/2000 | Seigneur et al. | 30/386 |
| 6,256,890 | B1 | | 7/2001 | Schliemann et al. | 30/386 |
| 6,893,185 | B1 | * | 5/2005 | Wood | 403/374.4 |

* cited by examiner

*Primary Examiner*—Michael P Ferguson
(74) *Attorney, Agent, or Firm*—Pillsbury Winthrop Shaw Pittman, LLP

(57) ABSTRACT

A part positioner according to the present invention is used for fixing a part having a first pair of opposite portions extending along a mounting surface to the mounting surface by use of a clamping fixture. The part positioner includes a pressing member for pressing the part against the mounting surface with a clamping force of the clamping fixture. The pressing member includes a pressing portion (tapered projection) for pressing the first pair of opposite portions in opposite directions in a position apart from the clamping fixture, owing to a clamping operation of the clamping fixture.

3 Claims, 5 Drawing Sheets

PART POSITIONER AND PART PRESSING MEMBER

BACKGROUND

1. Field of the Invention

The present invention generally relates to a part positioner for fixing parts to a mounting surface and, in particular, to a part positioner suitable for clamping and fixing parts to a mounting surface, such as a guide bar of a chain saw. The present invention also relates to a part pressing member constituting the part positioner, and the parts to be clamped and secured in position.

2. Background of the Invention

U.S. Pat. No. 6,256,890 discloses a rectangular-plate-like guide bar as a component of a chain saw, as an example of parts clamped and fixed to a mounting surface. This guide bar has guide grooves for guiding a saw chain on its outer periphery and is fixed to the guide-bar mounting surface of a chain saw main body as the aforementioned mounting surface. A stud bolt constituting a clamping fixture protrudes from the mounting surface to be inserted into a long mounting hole that is formed in the guide bar so as to extend in the length direction, i.e., a direction along which the mounting position of the guide bar to the chain saw main body is adjusted. With the stud bolt inserted into the long mounting hole of the guide bar and covered with a side cover that has an insertion hole for the stud bolt and serves as a pressing member, a nut (the nut and stud bolt constitute the clamping fixture) is tightened onto a tip end of the stud bolt, thereby clamping the guide bar to the guide-bar mounting surface with the aid of the side cover.

The guide bar should be securely and immovably fixed with respect to the chain saw main body. However, when the chain saw is being used, heavy load is successively applied to the leading end of the guide bar, and there is a fear that the mounted guide bar rattles. The guide bar is especially more likely to rattle in a chain saw having only one pair of a stud bolt and a nut as the clamping fixture.

In order to securely fix the guide bar to the chain saw main body, it is also required not to sacrifice the attachability/removability of the guide bar. That is, if fixed with plural clamping fixtures, the guide bar is of course securely fixed. However, if this means that replacement of the guide bar is complicated, such replacement is burdensome for a user.

BRIEF SUMMARY OF THE INVENTION

The present invention has been achieved in view of the above circumstances, and accordingly, it is an object of the present invention to provide a part positioner capable of more securely fixing parts to a mounting surface and assuring smooth attachment and removal of the parts.

It is another object of the present invention to provide a part pressing member suitable for the part positioner, and a part that can be fittingly fixed with the part positioner.

In order to attain the above objects, the present invention provides a part positioner for fixing a part having a first pair of opposite portions extending along a mounting surface in a face-to-face manner to the mounting surface by means of a clamping fixture, including: a pressing member for pressing the part against the mounting surface by means of the clamping force of the clamping fixture, the pressing member including a pressing portion for pressing the first pair of opposite portions in opposite directions in a position apart from the clamping fixture by a predetermined distance toward a length direction of the part, owing to a clamping operation of the clamping fixture.

With the above structure, the clamping operation of the clamping fixture causes the pressing member to clamp and press the part against the mounting surface by means of the clamping force of the clamping fixture. At the same time, the pressing portion of the pressing member presses the first pair of opposite portions in opposite directions along the mounting surface in a position apart from the clamping fixture by a predetermined distance, owing to the clamping operation of the clamping fixture. Accordingly, the part is securely fixed onto the mounting surface with the aid of the pressing member. Thus, even if a single fixture is provided as the clamping fixture, a problem of the displacement of the part along the mounting surface or the like does not arise. In addition, the part can be attached and removed only by tightening and loosing the clamping fixture, leading to a high attachability/removability of the part.

As a preferred embodiment, the first pair of opposite portions may oppose edges of a groove formed in the part along the length direction, and the pressing portion may be a tapered projection pushed into the groove.

As another preferred embodiment, the part may include: a part main body having a second pair of opposite portions facing each other in the same direction as the direction in which the first pair of opposite portions face each other; and a supporting member mounted to the part main body and having the first pair of opposite portions, and the supporting member may include a pair of pressure-contact portions that come into pressure contact with the second pair of opposite portions by the pressing portion being brought into pressure contact with the first pair of opposite portions.

In this case, the clamping operation of the clamping fixture causes the pressing member to clamp and press the part against the mounting surface by means of its clamping force. At the same time, the pressing portion of the pressing member presses the first pair of opposite portions formed in the supporting member so as to increase the distance therebetween along the mounting surface in a position apart from the clamping fixture toward the length direction of the part by a predetermined distance, owing to the clamping operation of the clamping fixture. As a result, the pair of pressure-contact portions of the supporting member come into pressure contact with the second pair of opposite portions formed in the part main body. In this way, the pressing member presses the part against the mounting surface through the clamping operation of the clamping fixture, and the part main body can be securely fixed under pressure through the supporting member even in a position apart from the clamping fixture by means of the pressing portion.

In this embodiment, by adding the supporting member to the part main body, the part main body can be securely fixed to the mounting surface through the supporting member. Thus, if the supporting member is fabricated so as to satisfy the above positional relationship between the supporting member and the clamping fixture, the part can be securely fixed to the mounting surface without changing the structure of the clamping fixture, which is preferred.

As another preferred embodiment, the first pair of opposite portions may be recesses each holding a part of an outer surface of the pressing portion. This structure preferably makes it possible to prevent the displacement between the pressing portion and the supporting member along the mounting surface without fail.

As another preferred embodiment, at least one of the second pair of opposite portions and the pair of pressure-contact portions may have knurls for increasing mutual friction. More preferably, this structure makes it possible to prevent the displacement between the supporting member and the part main body along the mounting surface without fail.

As another preferred embodiment, a position of the part main body may be movable with respect to a position of the clamping fixture in a predetermined direction along the mounting surface, and the supporting member may be mounted movably with respect to the part main body in the predetermined direction. With this structure, the fixing position of the part to the mounting surface is changeable along the predetermined direction.

As another preferred embodiment, the supporting member may be slidably fitted into a long hole formed in the part main body and have the second pair of opposite portions extending in the predetermined direction.

As still another preferred embodiment, the supporting member may include an engagement portion for preventing a displacement with respect to the clamping fixture. With this structure, the engagement portion suppresses the displacement between the supporting member and the clamping fixture, which is more preferred.

As still another preferred embodiment, the part may be a guide bar of a saw chain, and the mounting surface may be a guide-bar mounting surface formed in a main body of a chain saw.

The present invention provides a part pressing member for pressing a part having a first pair of opposite portions extending along a mounting surface in a face-to-face manner against the mounting surface by means of a clamping force of a clamping fixture, including: a pressing portion for pressing the first pair of opposite portions in opposite directions in a position apart from the clamping fixture by a predetermined distance toward a length direction of the part, owing to a clamping operation of the clamping fixture.

The present invention provides a part fixed to a mounting surface by means of a clamping fixture, including: a part main body; and a supporting member mounted to the part main body, the supporting member including a first pair of opposite portions extending along the mounting surface in a face-to-face manner, the part main body including a second pair of opposite portions facing each other in the same direction as the direction in which the first pair of opposite portions face each other, and the supporting member further including a pair of pressure-contact portions that come into pressure contact with the second pair of opposite portions when the first pair of opposite portions are applied with pressing force in opposite directions.

DETAILED DESCRIPTION OF THE INVENTION

Hereinafter, description will be made of an embodiment of a part positioner taking a guide bar constituting a chain saw as an operating machine as an example of parts to be fixed; the part positioner is suitably used for mounting and fixing the guide bar to a guide-bar mounting surface as a mounting surface of a chain saw main body.

Figure 1:
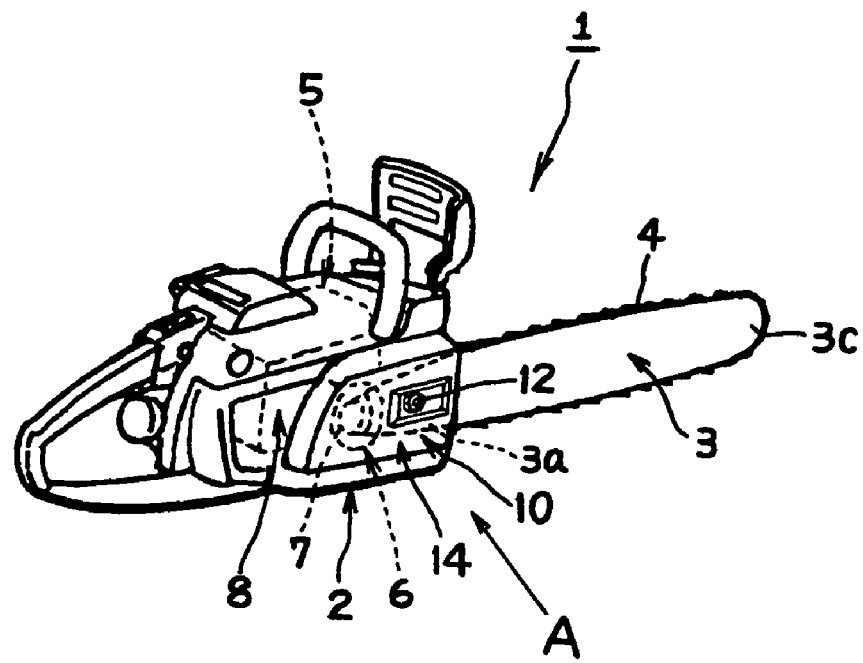
FIG. 1 is a perspective view of a chain saw as an example of a machine provided with a part positioner according to an embodiment of the present invention.

In FIG. 1, a main body 2 of a chain saw 1 in a finished form is provided with a rectangular-plate-like guide bar 3 as a detachably attachable part, which extends in a longitudinal direction of main body 2. A saw chain 4 is stretched around guide bar 3. Saw chain 4 is driven to move around guide bar 3 by means of a torque of an internal combustion engine 5 such as a compact air-cooled two-cycle gasoline engine mounted to main body 2, through a centrifugal clutch 6 and sprocket 7 coupled in gear with an output shaft (not shown) of internal combustion engine 5.

Figure 5:
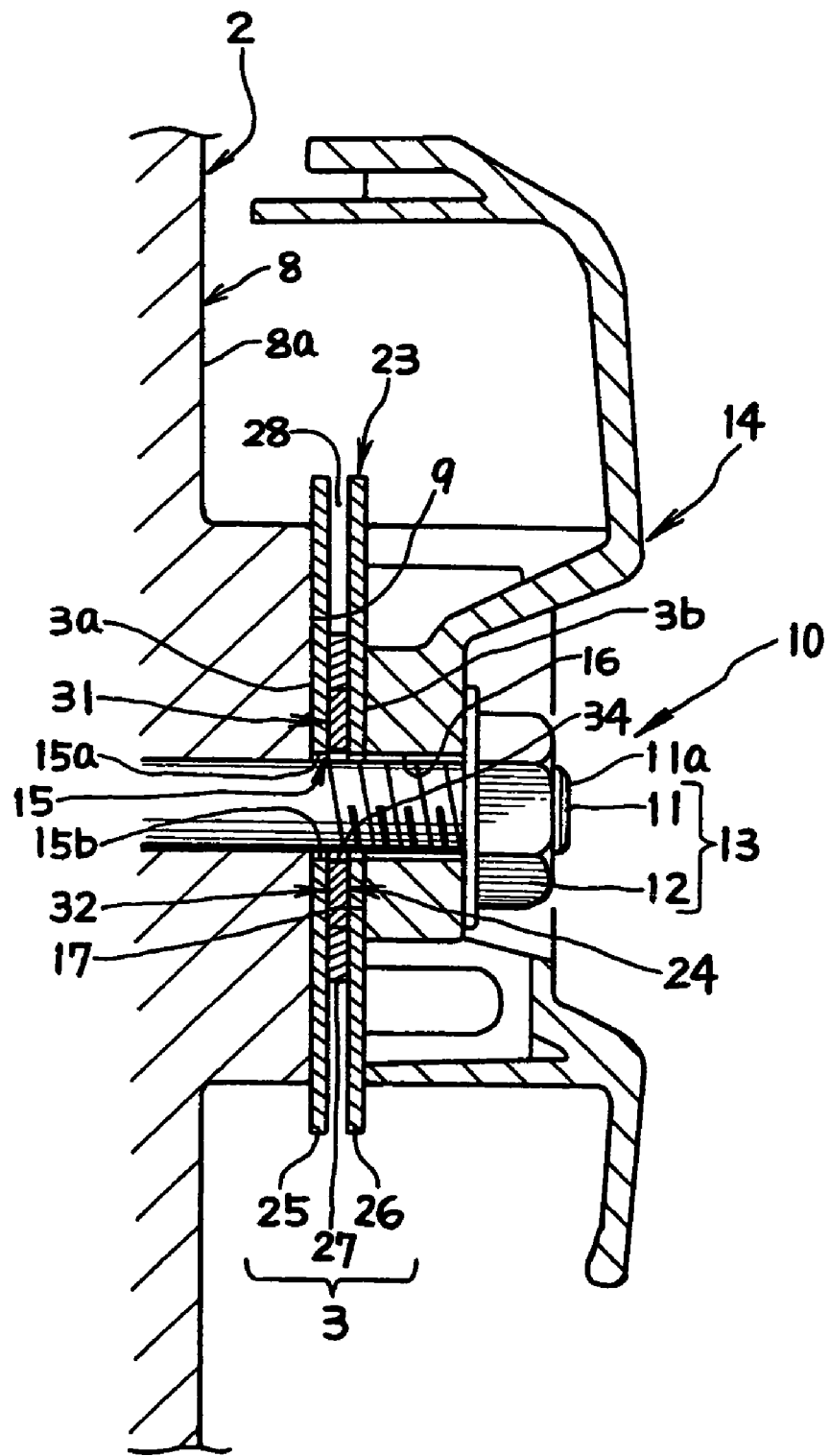
FIG. 5 is an enlarged sectional view taken along the line V-V of FIG. 2.
Figure 6:
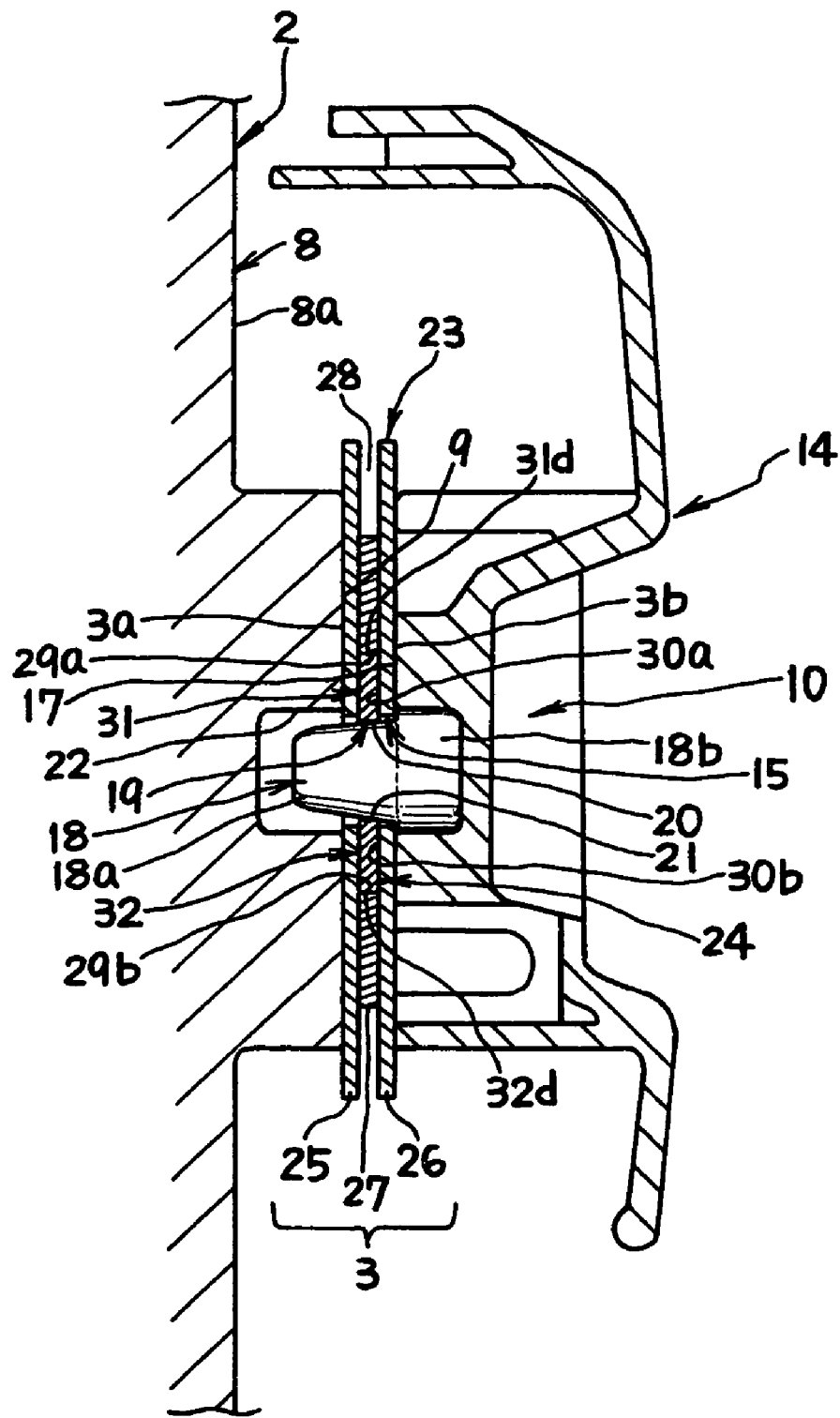
FIG. 6 is an enlarged sectional view taken along the line VI-VI of FIG. 2.

As shown in FIGS. 5 and 6, main body 2 includes an engine mounting frame 8. A guide-bar mounting surface 9 is defined as a mounting surface to which guide bar 3 is fixed, on a part of the outer surface of a side wall 8a of engine mounting frame 8 on an engine-power-output side. Guide-bar mounting surface 9 forms a flat vertical surface, and protrudes outwardly from engine-power-output-side side wall 8a of engine mounting frame 8 as viewed from the lateral direction, so as to prevent saw chain 4 from contacting engine mounting surface 8. Guide bar 3 is securely fixed to main body 2 by a part positioner 10 according to this embodiment with the side face of a proximal end 3a of part positioner 10 brought into close contact with guide-bar mounting surface 9.

Figure 2:
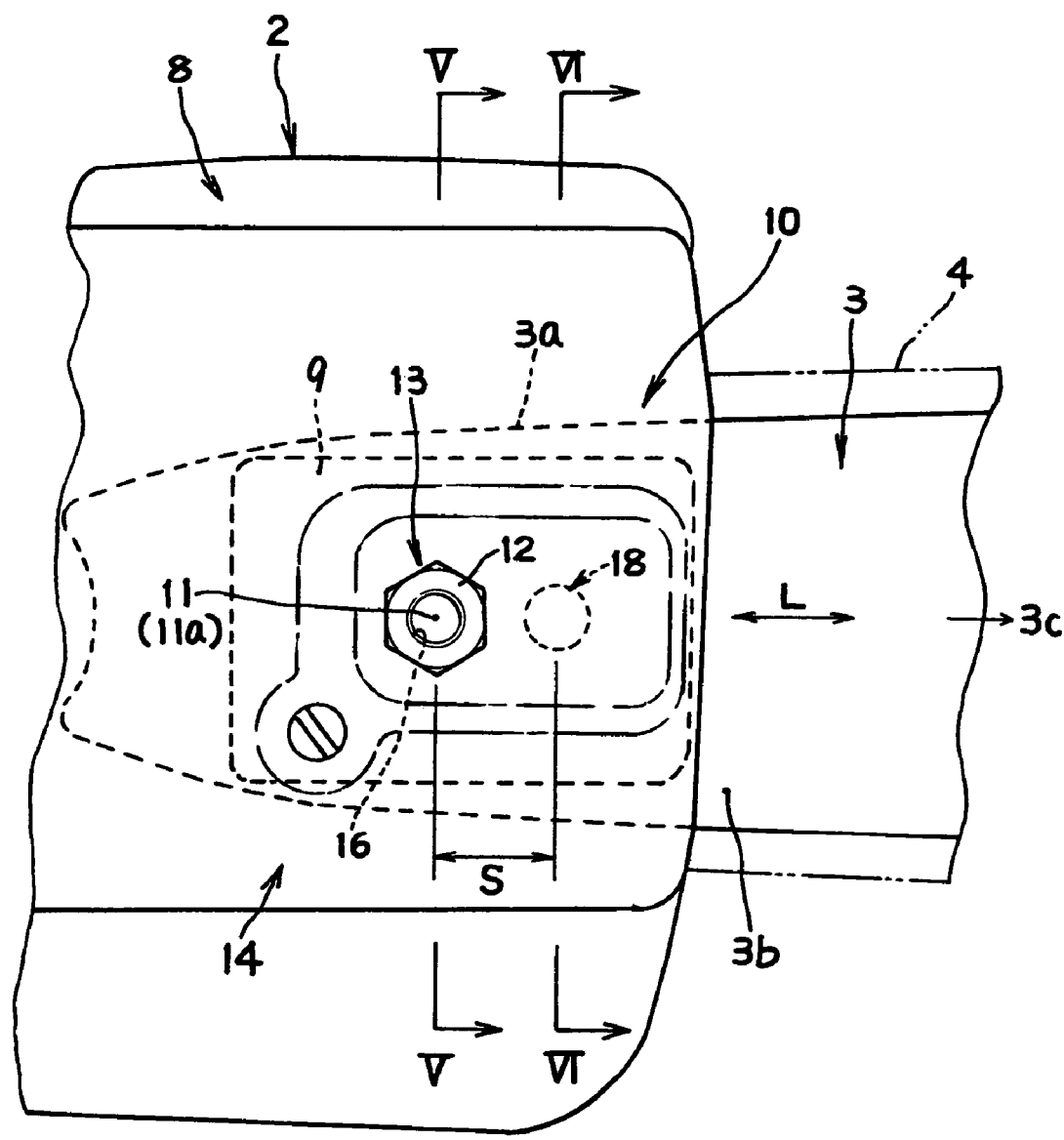
FIG. 2 is an enlarged view as viewed from the direction of the arrow A of FIG. 1.

As shown in FIGS. 2 and 5, part positioner 10 according to this embodiment includes one stud bolt 11 and a nut 12 which screw together to constitute a clamping fixture 13, and a side cover 14 as a part pressing member for clamping and pressing guide bar 3 against guide-bar mounting surface 9 by means of a clamping force of nut 12. As shown in FIG. 5, in this embodiment, the proximal end of stud bolt 11 is fixed to engine mounting frame 8, and stud bolt 11 protrudes outwardly from guide-bar mounting surface 9 in the lateral direction. Guide bar 3 and side cover 14 are put on guide-bar mounting surface 9 in order, so as to insert stud bolt 11 into a long mounting hole 15 passing through proximal end 3a of guide bar 3 along a length direction L of guide bar 3, and a stud bolt insertion hole 16 formed in side cover 14. A tip end 11a of stud bolt 11 protruding from side cover 14 is screwed to nut 12, by which means guide bar 3 is clamped and mounted to guide-bar mounting surface 9, and side cover 14 is securely fixed to engine mounting surface 8. Side cover 14 covers, as shown in FIG. 1, proximal end 3a of guide bar 3, centrifugal clutch 6, and sprocket 7.

As shown in FIG. 5, side cover 14 has a flat vertical pressing surface 17 on its inner surface opposite to guide-bar mounting surface 9. Pressing surface 17 presses proximal end 3a of guide bar 3 against guide-bar mounting surface 9, in close contact with an outer surface 3b opposite to proximal end 3a of guide bar 3 on main body 2 side. Further, side cover 14 has a tapered projection 18 as a pressing portion at a given distance from stud bolt insertion hole 16, on pressing surface 17. More specifically, this is in a position shifted from stud bolt insertion hole 16 to a leading end side 3c of guide bar 3 along length direction L of guide bar 3 by a predetermined interval S as shown in FIG. 2.

As shown in FIG. 6, when clamping fixture 13 clamps and fixes guide bar 3 and side cover 14, tapered projection 18, also referred to as a wedge pin or tapered wedge pin, is pushed into a groove (inclusive of a hole) 19 formed in guide bar 3 to come into pressure contact with opposite portions of groove 19, that is, a first pair of opposite portions 20 and 21 that are formed along guide bar mounting surface 9 in a face-to-face manner, while applying the same level of pressing force to both of first pair of opposite portions 20 and 21 in opposite directions.

As shown in FIG. 6, tapered projection 18 can be integrally formed on the inner surface of plastic side cover 14 through insertion-molding or the like. Tapered projection 18 is desirably formed of a hard material superior in abrasion resistance, for example, metal or hard plastic or other suitable materials. Tapered projection 18 is given a gradual upward slope to spread from tip end 18a on guide-bar mounting surface 9 side toward a proximal end 18b embedded in side cover 14. Tapered projection 18 is pushed in between the first pair of opposite portions 20 and 21 of guide bar 3 at the time of clamping and fixing guide bar 3 and side cover 14 by means of clamping fixture 13 to thereby naturally come into pressure contact with both opposite portions 20 and 21 while pressing guide bar 3 against guide-bar mounting surface 9.

In addition to this function, tapered projection 18 functions to press the first pair of opposite portions 20 and 21 so as to increase the distance therebetween along guide-bar mounting surface 9. The provision of tapered projection 18 in addition to clamping fixture 13 effectively suppresses displacement of guide bar 3 along guide-bar mounting surface 9 and securely fixes guide bar 3 to guide-bar mounting surface 9 so as not to cause any significant displacement.

In this embodiment, tapered projection 18 as the pressing portion is formed into a flat-topped conical shape, but the present invention is not limited to this shape. The pressing portion only needs to have a pair of inclined surfaces, or the like, that come into pressure contact with the first pair of opposite portions 20 and 21 with the same level of pressing force that increases in proportion to how far tapered projection 18 is pushed in between opposite portions 20 and 21.

Note that, as shown in FIG. 6, a tapered projection holding hole 22 is formed in guide-bar mounting surface 9 for the purpose of preventing the contact with tip end 18a of tapered projection 18 protruding through groove 19 of guide bar 3 toward guide-bar mounting surface 9 side. Tapered projection holding hole 22 has dimensions sufficient to receive tip end 18a of tapered projection 18 with an adequate margin even if guide bar 3 and side cover 14 are mounted, and extends along the length direction L of guide bar 3.

Figure 3:
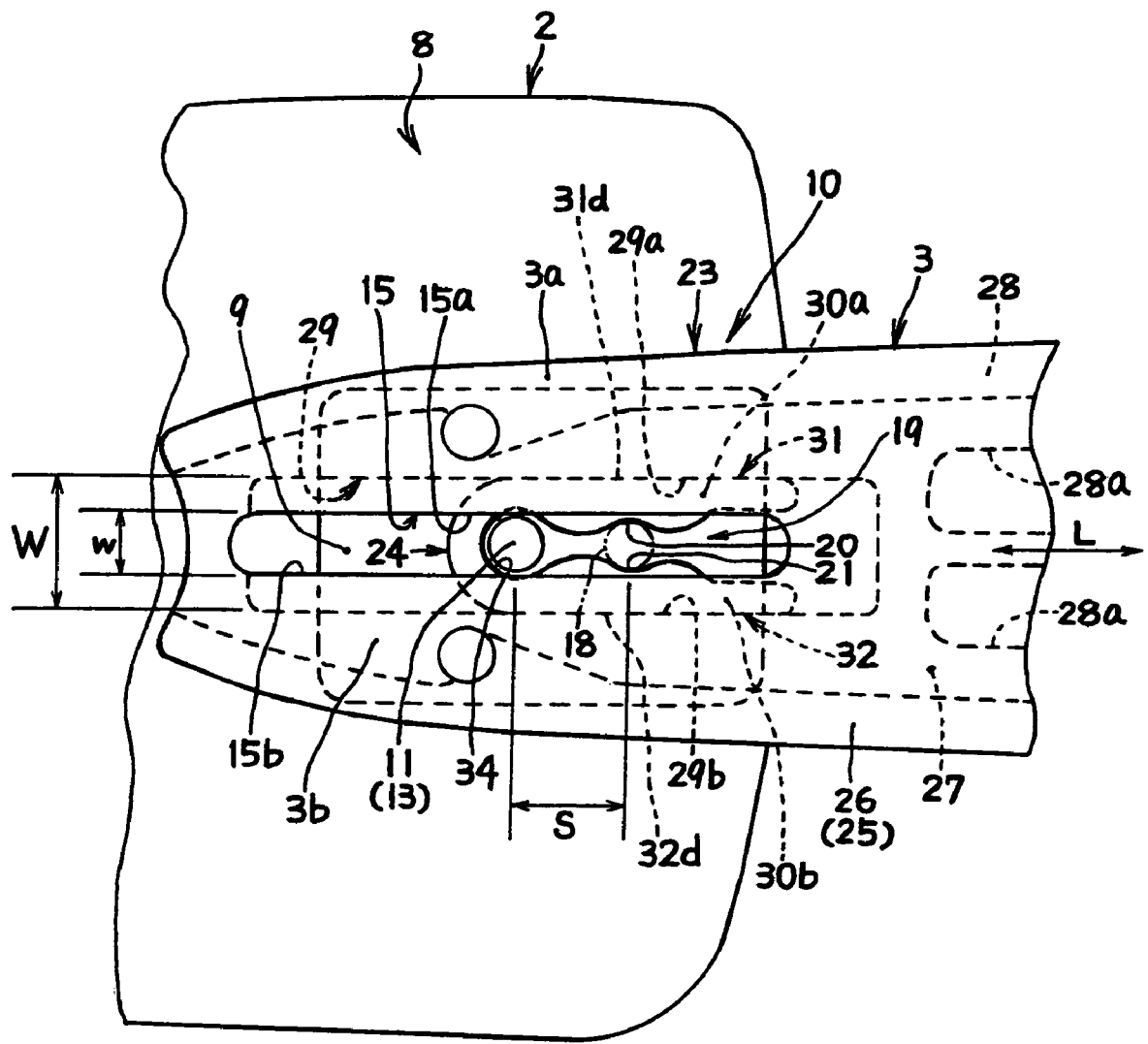
FIG. 3 is a side view of the chain saw of FIG. 2 from which a side cover as a part pressing member is removed.

As shown in FIG. 3, long mounting hole 15 extends in proximal end 3a of guide bar 3 along a direction in which the fixing position of guide bar 3 is adjusted, namely, the length direction L of guide bar 3. Long mounting hole 15 serves to receive stud bolt 11 movably along the length direction L of guide bar 3, and has a width w viewed from the vertical direction. Width w is somewhat larger than the outer diameter of stud bolt 11. The width w of long mounting hole 15 is uniform throughout the length direction L of guide bar 3. Long mounting hole 15 functions to adjust the mounting position of guide bar 3 with respect to engine mounting surface 8 along the length direction L of guide bar 3.

In the illustrated example, guide bar 3 includes a guide bar main body 23 as a part main body, and a supporting member (supporting part) 24 for fixing a guide bar, which is mounted to guide bar main body 23.

As can be understood from both FIGS. 3 and 6, guide bar main body 23 has a pair of right and left thin side plates 25 and 26 of substantially the same dimensions, which sandwich a thin intermediate plate 27 as a spacer with a smaller outer size than side plates 25 and 26. Side plates 25, 26 and intermediate plate 27 are integrally bonded to one another. Intermediate plate 27 being interposed between side plates 25 and 26, a saw chain guide groove 28 is formed along the outer periphery of guide bar main body 23. As shown in FIG. 3, recesses 28a are defined in given positions of intermediate plate 27 with a view to reducing weight.

Further, formed in intermediate plate 27 is a wide long-hole 29 extending in the length direction L similar to long mounting hole 15 and having width W larger than width w of long mounting hole 15 as viewed from the vertical direction, in a position corresponding to long mounting hole 15. An upper edge 29a and lower edge 29b of wide long-hole 29 serve as a second pair of opposite portions facing each other in the same direction as the direction in which the first pair of opposite portions 20 and 21 face each other, to extend in parallel along the length direction L of guide bar 3 like an upper edge 15a and lower edge 15b of long mounting hole 15. By forming wide long-hole 29 in intermediate plate 27, a pair of upper and lower recesses 30a and 30b extending along a predetermined direction, that is, the length direction L of guide bar 3 are formed in opposing upper edge 15a and lower edge 15b of long mounting hole 15 of guide bar 3, respectively. Recesses 30a and 30b are formed at the same depth from upper edge 15a and lower edge 15b of long mounting hole 15, respectively.

Figure 4:
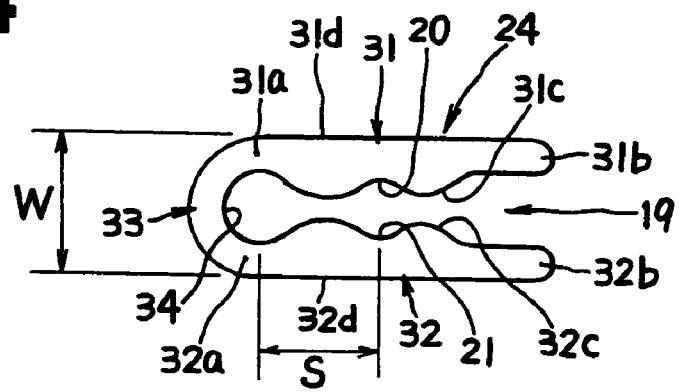
FIG. 4 is a side view of a support member of FIG. 3.

Meanwhile, supporting member 24 has, as shown in FIGS. 3 and 4, a pair of upper and lower arm portions 31 and 32 extending substantially in parallel along the length direction L of guide bar 3, and a coupling portion 33 coupling rear ends 31a and 32a of the pair of upper and lower arm portions 31 and 32 with each other. The arm portions and the coupling portion are integrally formed. Groove 19 extending in the length direction L of guide bar 3 is formed between upper and lower arm portions 31 and 32. Front ends 31b and 32b of the pair of upper and lower arm portions 31 and 32 are not coupled with each other. In supporting member 24, at least coupling portion 33 has an elasticity or deformability so as to outwardly warp upper and lower arm portions 31 and 32 in opposite directions albeit slightly. A stud bolt holding hole 34 is formed inside coupling portion 33 with the diameter slightly larger than the outer diameter of stud bolt 11. This acts as an engagement portion for preventing displacement with respect to stud bolt 11. The inner periphery of stud bolt holding hole 34 continues to an inner upper edge 31c and inner lower edge 32c that define groove 19 between upper and lower arm portions 31 and 32.

The pair of upper and lower recesses 20 and 21 concaved in opposite directions are formed as the first pair of opposite portions, in vertically opposing positions of inner upper edge 31c and inner lower edge 32c of supporting member 24 with a predetermined interval S from stud bolt holding hole 34. The predetermined interval S between stud bolt holding hole 34, and the pair of upper and lower recesses 20 and 21 is the same as the predetermined interval S between stud bolt insertion hole 16 and tapered projection 18 in side cover 14 (see FIG. 2).

As shown in FIG. 3, in such a state that supporting member 24 is mounted to guide bar main body 23, the pair of upper and lower recesses 20 and 21 have a contour protruding toward upper edge 15a and lower edge 15b of long mounting hole 15 within the width w of the long mounting hole, and gently curving along the circumference of tapered projection 18.

An outer upper edge 31d and outer lower edge 32d of the pair of upper and lower arm portions 31 and 32 of supporting member 24 extend substantially in parallel along the length direction L of guide bar 3. The vertical interval W between outer upper edge 31d and outer lower edge 32d of the pair of upper and lower arm portions 31 and 32 is almost the same as the width W of wide long-hole 29 albeit slightly smaller.

As shown in FIGS. 5 and 6, supporting member 24 has a uniform thickness that is slightly smaller than intermediate plate 27 of guide bar 3. Supporting member 24 is mounted to guide bar main body 23 such that the pair of upper and lower arm portions 31 and 32 are slidably fitted along the length direction L into the pair of upper and lower recesses 30a and 30b formed along upper edge 15a and lower edge 15b of long mounting hole 15 of guide bar main body 23, respectively. In other words, in assembling guide bar main body 23 with the pair of right and left side plates 25 and 26, and intermediate plate 27, supporting member 24 may be fitted into wide long-hole 29. If supporting member 24 is made movable with respect to guide bar main body 23 along the length direction L in this way, the mounting position of guide bar main body 23 to guide-bar mounting surface 9 can be adjusted along the length direction L of guide bar 3. Hence, the operation of stretching the saw chain or the removal/attachment operation are preferably facilitated.

As shown in FIG. 3, with supporting member 24 being mounted to guide bar main body 23, the position of stud bolt holding hole 34 of supporting member 24 is designed to overlap with long mounting hole 15 of guide bar main body 23. Likewise, with supporting member 24 being mounted to guide bar main body 23, outer upper edge 31d and outer lower edge 32d of supporting member 24 come into slight contact with upper edge 29a and lower edge 29b of wide long-hole 29, respectively. Further, the right and left side faces of the pair of upper and lower arm portions 31 and 32 of supporting member 24 come into close contact with opposing inner surfaces of the pair of right and left side plates 25 and 26 within the pair of upper and lower recesses 30a and 30b. Supporting member 24 mounted to guide bar main body 23 is slidable along the direction in which the fixing position of guide bar 3 is adjusted, namely, along the length direction L of guide bar main body 23.

As shown in FIG. 5, in mounting and clamping guide bar 3 to engine mounting surface 8, stud bolt 11 is inserted through stud bolt holding hole 34 of supporting member 24 constituting guide bar 3 so as to arrange guide bar 3 and side cover 14 in order on guide bar mounting surface 9. Then stud bolt 11 is inserted into stud bolt insertion hole 16 of side cover 14. In addition, as shown in FIG. 6, tapered projection 18 of side cover 14 is pushed in between the pair of upper and lower recesses 20 and 21 of supporting member 24 to screw and tighten tip end 11a of stud bolt 11 protruding from side cover 14 into nut 12 with captive washer.

Thus, pressing surface 17 in the inner surface of side cover 14 presses guide bar 3 against guide-bar mounting surface 9 with the pressing force corresponding to the clamping force of nut 12. At this time, tapered projection 18 of side cover 14 presses the pair of upper and lower recesses 20 and 21 of supporting member 24 with the same level of pressing force so that the upper and lower recesses 20 and 21 of supporting member 24 expand outwardly and away from each other as viewed from the vertical direction along guide-bar mounting surface 9.

In this embodiment, the upper and lower tapered surfaces forming the outer surface of tapered projection 18 are fitted to the pair of upper and lower recesses 20 and 21, respectively. Thus, it is possible to avoid the displacement between tapered projection 18 and supporting member 24 in the length direction L of guide bar 3 without fail.

As shown in FIG. 3, when the pair of upper and lower arm portions 31 and 32 of supporting member 24 are pressed with the same level of pressing force to increase the vertical interval therebetween by pushing tapered projection 18 between upper and lower recesses 20 and 21 of supporting member 24, outer upper edge 31d and outer lower edge 32d of the pair of upper and lower arm portions 31 and 32 are brought into pressure contact with upper edge 29a and lower edge 29b of wide long-hole 29, respectively, as a pair of pressure-contact portions. As a result, supporting member 24 is securely integrated with guide bar main body 23, and upper edge 29a and lower edge 29b of wide long-hole 29 are respectively pressed with the same level of pressing force to increase the vertical interval therebetween. This effectively suppresses the displacement of guide bar 3, especially, the vertical displacement with respect to stud bolt 11.

In this embodiment, the addition of supporting member 24 to guide bar main body 23 makes it possible to securely fix guide bar main body 23 to guide-bar mounting surface 9 through supporting member 24. Therefore, even in an existing chain saw 1 provided with only a single stud bolt, if supporting member 24 is fabricated so as to satisfy the aforementioned positional relationship between guide bar main body 23 and supporting member 24, guide bar 3 can be securely fixed to guide-bar mounting surface 9 with only few changes of the structure of guide bar main body 23.

Note that if knurls for increasing the mutual friction are formed on at least one of upper edges 29a and lower edge 29b of wide long-hole 29, and outer upper edge 31d and outer lower edge 32d of the pair of upper and lower arm portions 31 and 32 of supporting member 24, the displacement never occurs between supporting member 24 and guide bar main body 23 along the length direction L of guide bar 3. Thus, guide bar 3 is more securely fixed to guide-bar mounting surface 9, which is more preferable.

By means of part positioner 10, guide bar 3 can be securely fixed to guide-bar mounting surface 9. Hence, even if a heavy load is successively applied to the leading end side 3c of guide bar 3 during the operation of cutting down a tree, guide bar 3 is less likely to rattle. This preferably leads to the enhanced workability, and also prevents saw chain guide groove 28 formed in guide bar 3 from abnormally wearing out at early stages. Further, one stud bolt 11 suffices for engine mounting frame 8 side, so engine mounting frame 8 can be advantageously fabricated with ease. Moreover, guide bar 3 can be attached/removed only by tightening/loosening single nut 12. Thus, the attachability/removability of guide bar 3 is enhanced.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device repositionably clamping a part to a housing, comprising:
   a housing having a mounting surface;
   a part having a first elongated mounting channel defining a longitudinal direction, the part being repositionably clamped to the mounting surface in the longitudinal direction;
   a cover having a clamping surface, the part being clamped between the clamping surface and the mounting surface;
   a tapered wedge pin attached to and perpendicularly projecting from a surface of the cover opposite the clamping surface;
   a threaded rod attached to and perpendicularly projecting from the mounting surface of the housing, wherein the cover includes a clamping hole through which the threaded rod is inserted, wherein the tapered wedge pin and threaded rod are spaced apart from each other and have parallel longitudinal axes;
   a clamping member for repositionably fixing the part to the mounting surface, the clamping member being slidably positioned within the first mounting channel, the clamping member having opposing upper and lower arm portions defining a second clamping channel perpendicular to the longitudinal axes of the tapered wedge pin and the threaded rod and extending in the longitudinal direction of the first channel, wherein the two opposing arm portions are configured to engage the wedge pin and clamp against opposing upper and lower sides of the first channel, wherein the threaded rod perpendicularly extends through a holding hole in the clamping member and the clamping hole in the cover and the tapered wedge pin perpendicularly extends through respective upper and lower recesses in the opposing arm portions, wherein tightening a nut onto the threaded rod against the clamping surface of the cover with respect to the housing draws the tapered wedge pin into engagement with the opposing arm portions of the clamping member causing the opposing arm portions to expand radially and engage the opposing upper and lower sides of the first channel, thereby securing the part with respect to the housing at a desired position.

2. The device of claim 1, wherein the clamping member has a U-shaped configuration.

3. The device of claim 1, wherein the part is a guide bar of a chain saw.

* * * * *